Figure 1:
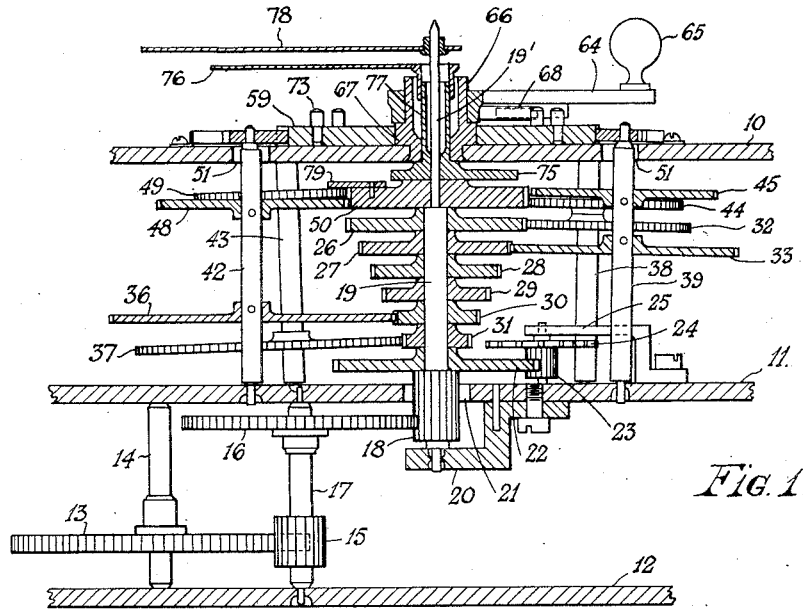

June 9, 1942.  P. F. EVERITT  2,285,856
MEANS FOR EVALUATING AND INDICATING THE AVERAGE
VALUE OF SUCCESSIVE TIME OBSERVATIONS
Filed Aug. 3, 1938

PHILIP FRANCIS EVERITT
INVENTOR
Myron B. Stevens
ATTORNEY

Patented June 9, 1942

2,285,856

UNITED STATES PATENT OFFICE 2,285,856

MEANS FOR EVALUATING AND INDICATING THE AVERAGE VALUE OF SUCCESSIVE TIME OBSERVATIONS

Philip Francis Everitt, Ilford, England, assignor of two-thirds to Arthur Joseph Hughes, Chigwell Row, England, and Henry Hughes & Sons, Limited, London, England, a corporation of Great Britain Application August 3, 1938, Serial No. 222,932
In Great Britain August 9, 1937

6 Claims. (Cl. 235—61)

This invention relates to means for evaluating and indicating the average value of a succession of times or time observations, and an object of the invention is to provide a device which will indicate directly, at the end of a predetermined number of operations or observations, the average value of the times (measured from some time datum) at which the operations occurred or the observations were made. The device does not average the lengths of time of the operations.

The theoretical considerations underlying the invention will be understood from the following:

If any number $n$ of operations or observations are made, starting from some time $t_0$ as datum, at times $t_1, t_2 \ldots t_n$, then the average value of the times will be the summation of these times divided by the number of observations, or $$\frac{t_1+t_2+\ldots t_n}{n}$$

Now the increments of time between the successive operations or observations measured from the datum to $t_1$ and then from $t_1$ to $t_2$ and so on, are $t_1-t_0$; $t_2-t_1$; ... $t_n-t_{n-1}$, and as the first increment $(t_1-t_0)$ exists during the whole of the observations $n$ while the next increment $(t_2-t_1)$ exists for one less than the total observations; i. e. $n-1$, and so on, the summation of these values can be written as $$n(t_1-t_0)+(n-1)(t_2-t_1)+\ldots(t_n-t_{n-1})$$

and the average of the times in question is consequently $$t_0+\frac{n(t_1-t_0)+(n-1)(t_2-t_1)+\ldots(t_n-t_{n-1})}{n}$$

$$t_0+1(t_1-t_0)+\frac{n-1}{n}(t_2-t_1)+\ldots\frac{1}{n}(t_n-t_{n-1})$$

One embodiment of the present invention consists in apparatus for performing mechanically the method of finding the average of successive times which is represented by the above expression.

In this embodiment a watch or clock or other time indicating or recording instrument has interposed between the driving mechanism and the indicating or recording means (which may be either hands moving over a dial, a train of wheels carrying figures, or any other suitable means) change speed gearing having a plurality of ratios corresponding with the predetermined number of time observations to be averaged, and each speed change (starting from a direct drive or one to one ratio) gives a speed reduction which is less than the preceding speed ratio by the reciprocal of the number of observations to be averaged; that is to say if $n$ is the number of observations to be averaged then the watch or clock has $n$ alternative gears interposed between the driving mechanism and the indicating means and these $n$ gears are in the ratio $$1, \frac{n-1}{n}, \frac{n-2}{n} \ldots \frac{1}{n}$$

and are engaged in succession by any suitable operating means. When such a watch or clock is first set to zero and started with the first gear ratio, viz 1, in use at any time serving as a datum and the gear change is operated at each successive time of which the average is desired, and the watch is stopped at the last of these times, then the indicating mechanism will show the average of the successive times at which the gear was operated.

The means for carrying out the gear change may be actuated by hand at each of the times to be averaged or the actuation may be performed automatically by any instrument or mechanism to which the watch or clock is attached.

If the instrument is provided with a constantly driven time indicating means, i. e. an ordinary clock dial or a seconds hand constantly making one revolution per minute, the average of the successive time instants can be obtained by an alternative method in which successive gear changes of increasing speed are used to speed up a time indicating pointer or other means and the average of the successive time instants is obtained by subtracting the reading of the latter indicator at the end of the observations from the normal time indication as shown by the ordinary clock dial or seconds hand. This method is more fully described later.

Figure 2:
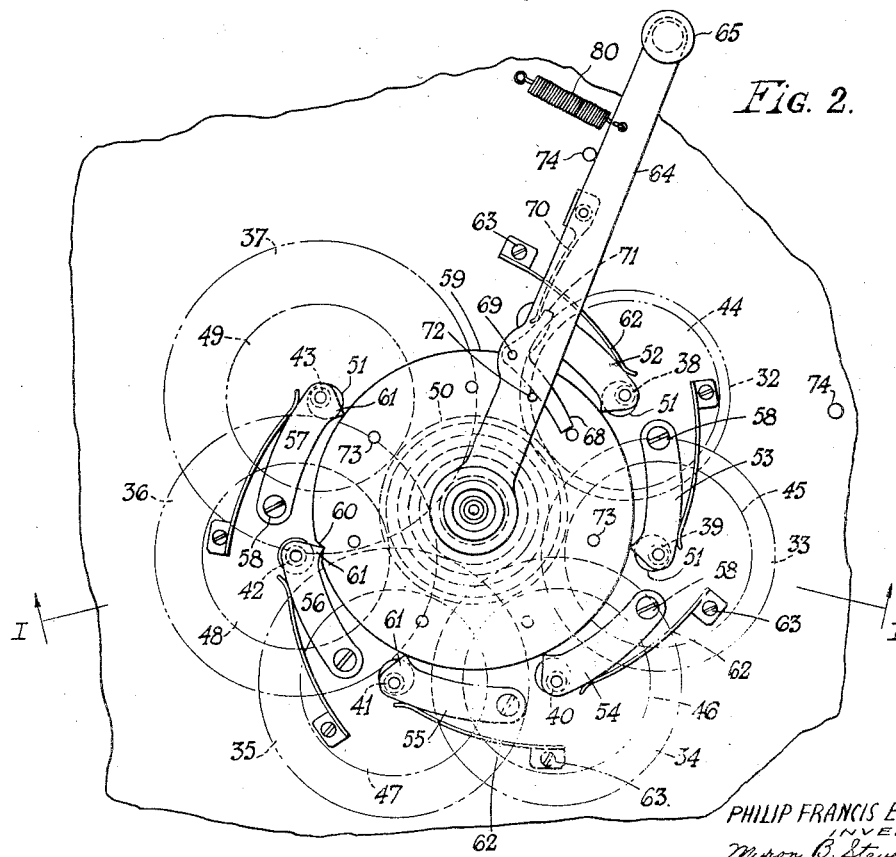

The accompanying drawing illustrates, by way of example, one suitable form of time averaging mechanism in which the average is indicated directly and is obtained by the first of the above-mentioned methods of averaging, and in the drawing Fig. 1 is a sectional elevation through the mechanism, taken on line 1—1 of Fig. 2, and Fig. 2 is a plan view with the indicating pointers and dial removed to show more clearly the means for carrying out the gear changes, the gears being indicated diagrammatically.

The mechanism now to be described is one which is suitable for indicating directly the average of six successive times, but it will be understood that the invention is not limited to means for averaging only six time observations but can be designed for averaging any predetermined number of time instants. The mechanism illustrated consists of three frame plates 10, 11, 12 (Fig. 1) which carry the mechanism and contain the sockets for the ends of the spindles of the mechanism and the three frame plates are spaced apart to the required distances by spacing pieces or pillars (not shown) of the form usual in clock construction.

Between the two lower frame plates 11 and 12 is mounted a spring driven clock mechanism of any suitable well known form and of this only the final members of the train of clock wheels are shown, namely a pinion 13 on spindle 14 driving a pinion 15 and a larger pinion wheel 16, both on the same spindle 17 carried in bearings in the frame plates 11 and 12, and these wheels are part of the driving train for the averaging mechanism according to the invention.

The last pinion 16 of the driving train drives a smaller pinion 18 secured on a spindle 19 which is journaled at its lower end in a bracket 20 secured to the underside of the frame plate 11. The pinion 18 extends through a clearance hole 21 in the plate 11 and its upper end is integral with a larger pinion 22 which drives, through pinion 23, an escape wheel 24 which regulates the rotation of the pinion 18 and its spindle 19 to a predetermined speed—in the actual construction shown the pinion 18 runs at 1 revolution per minute. The escape wheel arbor is journaled in the plate 11 and in a bracket 25.

Secured on the spindle 19 is an inverted conical pile of six driver gears 26, 27, 28, 29, 30, and 31 and each one of these is constantly in mesh with a separate driven gear, the six separate driven gears being secured on separate spindles disposed in a circle centred on the axis of spindle 19. This will be clear from Fig. 2 where the six separate driven gears are indicated at 32, 33, 34, 35, 36, and 37 each on its own spindle 38, 39, 40, 41, 42, 43. The first pair of gears 26 and 32 are of equal sizes so that the spindle 38 runs at the same speed as the central spindle 19, the next pair 27 and 33 are proportioned so that spindle 39 runs at 5/6 of the speed of the central spindle 19 and so on through successive speed reductions of 4/6, 3/6, 2/6 so that the last pair of pinions 31 and 37 are proportioned so that spindle 43 runs at 1/6 of the speed of the central spindle 19. Only four of the spindles 38 to 43 are shown in Fig. 1; the section being taken through the spindle 39 which carries the driven gear 33 (meshing with the driver 37) and running at 5/6 of a revolution per minute, then through the centre line of spindle 19 and through the centre line of spindle 42 which carries the driven gear 36 (meshing with driver gear 30) and running at 2/6 of a revolution per minute.

Each of the spindles 38 to 43 has secured on it near its upper end a fine toothed driver gear 44, 45, 46, 47, 48, 49 and each of the driver gears 44 to 49 can be made to mesh in turn (by the means hereinafter described) with a central driven fine-toothed pinion 50 which runs loosely on the reduced portion 19' of the central spindle 19. Each of the spindles 38 to 43 is journaled at its lower end in the frame plate 11 but passes at its upper end through a clearance hole 51 in the top frame plate 10 so that, if the upper ends of the spindles 38 to 43 are pushed outwards slightly, any or all of the driver gears 44 to 49 can be held out of mesh with the central pinion 50. Since the driver gears 44 to 49 and the pinion 50 have very fine teeth, while the pinions 26 to 31 and 32 to 37 have relatively coarse teeth it is easily possible to disengage the drivers 44 to 49 from the central pinion 50 without disengaging the driven pinions 32 to 37 from the central pile of gears 26 to 31. A further advantage of the fine teeth on the disengageable gears is that any errors due to possible misalignment of the interengaging teeth when each of the driver gears is brought into mesh with the central pinion only amounts to one tooth space and can thus be made very small.

The driver gears 44 to 49 and the central pinion 50 are all of the same diameter so that the central pinion 50 rotates at the same speed as the spindle of whichever of the driver gears 44 to 49 is in mesh with it, but the pinion 50 is thicker than the driver gears 44 to 49 and the six drivers overlap alternately above and below one another to provide a clearance between adjacent wheels.

The arrangement for allowing the driver gears 44 to 49 to mesh successively with the central pinion 50 or to move them all out of mesh therewith is as follows. The floating upper ends of the six spindles 38 to 43 are supported in pivot bearings at the free ends of six pawls or arms 52, 53, 54, 55, 56, 57 (Fig. 2) which are pivoted on pivot pins 58 on the top frame plate 10 and are disposed as shown in Fig. 2 round a circular cam 59 having a single notch 60 in its periphery. Each of the arms 52 to 57 has a beak 61 and is biased towards the cam 59 by a spring 62 secured by a screw 63 at one end to the top frame plate 10 and bearing at its free end on the back of its associated pawl or arm. Above the cam 59 is a freely pivoted lever 64 having a hand knob 65. Lever 64 is mounted to swing on an extension 66 of a boss 67 fixed to the top frame plate 10 in the centre of the circular cam 59 and on which the cam rotates. On the underside of the lever 64 is a pawl 68, pivoted on a pin 69 projecting from the lever, and having a biasing spring 70 secured to the lever 64 at one end and bearing at its free end on the tail 71 of the pawl 68 to press the latter against a stop pin 72 also projecting from the underside of the lever 64. Projecting from the upper face of the cam 59 are seven pins 73 which are positioned in a circle and are spaced so that, as the lever 64 is rocked between two stop pins 74 projecting from the top plate 10, the pawl 68 thereon engages each of the pins 73 in turn so that at each rocking movement of the lever the cam 59 is stepped round through the space between one of the six pawls 52 to 57 and the next adjacent pawl, so that after six rocking movements of the lever 64 each of the six pawls 52 to 57 in turn has been allowed to drop its beak 61 into notch 60 in the cam 59. When the pawl 68 on the lever 64 engages the seventh pin projecting from the cam 59 the latter is turned to a position in which the notch 60 is clear of all the beaks 61 and all the arms 52 to 57 are held out. This constitutes a zero position and when the cam 59 reaches this position an arm (not shown) is allowed to act on a heart cam 75 secured to the central pinion 50 so as to return this pinion and a hand or pointer 76 secured frictionally on a sleeve 77 integral with the heart cam 75 to a starting or zero position. The pointer 76 moves over a suitably graduated dial (not shown) and an additional pointer 78 is secured frictionally on the reduced end 19' of the central spindle 19 and also moves round over the dial.

In the position of the mechanism shown the beak 61 of arm 56 is in the notch 60 of the cam 59 so that the pointer 76 is moving round at 2/6 of its starting speed (the speed of the spindle 19) and the drive from spindle 19 is through driving gear 30 and the driven gear 36 to spindle 42 which rotates at 2/6 of the speed of spindle 19 by reason of the gear ratio between the gears 30 and 36 and from spindle 42 through the driver pinion 48 to the loose central pinion 50 (the driver pinion 48 being the only one in mesh with pinion 50) and as these pinions 48 and 50 are of equal diameter the pointer 76 rotates at 2/6 of the speed of spindle 19.

The time averaging action is as follows:

Assuming that the cam 59 is at zero position with all the arms 52 to 57 held out, the pointer 76 will be at zero or starting position. The clockwork driving train is started and the lever 64 is rocked to bring the notch 60 of cam 59 opposite the beak of arm 52. The arm 52 swings inwards slightly and driver pinion 44 on spindle 38 engages the loose central pinion 50 and the pointer 76 starts rotating at normal speed since spindle 38 is driven from spindle 19 through the equal gears 26 and 32. At the first of the time instants to be averaged the lever 64 is rocked to rotate the cam 59 to bring the notch 60 opposite the beak of arm 53. This movement disengages the driver pinion 44 from driven pinion 50 since the arm 52 and the upper end of spindle 38 are swung outwards again and the second arm 53 now swings inwards and driver pinion 45 engages pinion 50 and the pointer 76 rotates at 5/6 of normal speed. At the second of the time instants to be averaged the lever 64 is rocked again to bring into action the 4/6 speed drive. At the third of the time instants another rocking movement of lever 64 brings into action the 3/6 speed drive.

At the fourth time instant the 2/6 speed drive is engaged and the mechanism is in the position shown, i. e. the drive is through gears 30 and 36, spindle 42, driver pinion 48 and driven pinion 50. At the fifth time instant the last arm 57 is allowed to move inwards and the pointer 76 is rotating at $1/6$ normal speed. When the sixth and last time instant is reached the average of the six times can be read directly from the position of the pointer 76 at that instant since the pointer 76 is rotating so slowly as to make its instantaneous position easily readable, or the driving train can be stopped at the sixth time instant so that it indicates directly the average of the six times.

The pointer 78, of course, rotates steadily all the time the clock driving train is running, and indicates ordinary or mean time and is preferably coloured black. The pointer 76 which shows the average time is preferably coloured red.

There is secured on the central pinion 50 a projection or extended tooth 79 which, at each revolution of the pointer 76 and pinion 50, engages a counter wheel (not shown) which is thus partially rotated to actuate an indicator showing the number of complete rotations of the pointer 76 in any well known manner.

The lever 64 is moved against the action of a return spring 80 to turn the cam 59 through the space between adjacent pawls 52 to 57 and each time the lever 64 returns under the action of the return spring 80 the pawl 68 carried by the lever snaps behind the next of the pins 73 ready to step the cam 59 forward again immediately upon the next actuation of the lever. The lever 64 may be moved by hand or may be moved by any suitable mechanical or electrical operating device, in which case the knob 65 is replaced by a suitable connection for coupling it to the actuating means.

The following specific example illustrates the operation of the device:

Assume that we are going to observe the times at which certain observations are taken, these observations being six in number. Before these observations are taken we set the watch, in this case the hand 78, at some reference or datum point, say $4^h00^m00^s$. The six observations are made and the time at which each was made is noted in column 1 of the following table, the first observation being made at $4^h02^m05^s$, the second at $4^h04^m17^s$, and so on. The ordinary method of ascertaining the average time at which each observation was made would be to add the six time indications, their sum being $24^h38^m00^s$, and to divide by six, getting an average time value of $4^h06^m20^s$. My method eliminates this manual addition and division as follows:

We form the differences in the second column between successive operations, and not from the datum line, and these are shown as $$t_1-t_0=2^m05^s, \quad t_2-t_1=2^m12^s,$$

and so on. Then these differences are multiplied by the successive values of $$1, \frac{n-1}{n}, \frac{n-2}{n}, \text{ etc.}$$

where $n$ is the total number of observations, in this case six, so that these six differences are multiplied respectively by 1, 5/6, 4/6, 3/6, 2/6, and $1/6$, the products being shown in column 3 as $2^m05^s$, $1^m50^s$, etc. The sum of the six quantities in column 3 is found to be $6^m20^s$ which, when added to the datum time of $4^h00^m00^s$, gives $4^h6^m20^s$, is the same average which has been otherwise achieved at the bottom of column 1.

EXAMPLE $n=6$

*Times of observation*

|  | Col. 1 | | | Col. 2 | | | Col. 3 | |
|---|---|---|---|---|---|---|---|---|
|  | h. m. s. | | | m. s. | | | h. m. s. | |
| Datum.... | 4 00 00 | $t_0$ | | 2 05 | | $=t_1-t_0\times 1=$ | 2 05 | |
|  | 4 02 05 | $t_1$ | | 2 12 | | $=t_2-t_1\times 5/6=$ | 1 50 | |
|  | 4 04 17 | $t_2$ | | 1 30 | | $=t_3-t_2\times 4/6=$ | 1 00 | |
|  | 4 05 47 | $t_3$ | | 1 00 | | $=t_4-t_3\times 3/6=$ | 0 30 | |
|  | 4 06 47 | $t_4$ | | 2 00 | | $=t_5-t_4\times 2/6=$ | 0 40 | |
|  | 4 08 47 | $t_5$ | | 1 30 | | $=t_6-t_5\times 1/6=$ | 0 15 | |
|  | 4 10 17 | $t_6$ | | | | | | |
| Sum...... | 24 38 00 | | | | | | 6 20 | |
|  | | | | | | Plus datum. | 4 0 00 | |
| Average. | 4 06 20 | | | | | Average..... | 4 06 20 | |

From the above, it will be seen that the process of obtaining the average of a number of successive times of observation, is to form the differences of the successive times of observation, including the difference between the first time of observation and the datum time, these differences being $n$ in number where $n$ is the number of observations whose average is desired. These differences are then multiplied by the specific factors $$1, \frac{n-1}{n} \ldots \frac{1}{n}, \text{ etc.}$$

and these corrected quantities are then summed and added to the datum time.

This method is realized mechanically in the invention by starting the time indicating or recording mechanism at the datum time and carrying it on to a dial or totalizer, etc. according to the nature of the indicating or recording mechanism it is desired to embody. This connection is made through a train of successive gears whose ratios are $$1, \frac{n-1}{n}, \frac{n-2}{n} \ldots \frac{1}{n}$$

which are engaged in succession, the changes being made from unity to $$\frac{n-1}{n}$$

at the time of the first observation. The change from $$\frac{n-1}{n} \text{ to } \frac{n-2}{n}$$

is made at the time of second observation, and the mechanism is stopped at the time of the last observation. As the time indicating or recording mechanism is necessarily in itself a totalizer, no special totalizing mechanism is required, and the time shown on the time-indicating or recording part of the apparatus subsequent to the end of the series of observations, which have been taken, when added to the time at which the time-recording apparatus was originally set in motion before the first time which was to be observed, gives the average time at which the $n$ observations were made.

Although the above described mechanism is suitable for averaging six successive instants of time, it is obvious that by providing the appropriate number of change speed gears, instead of the six shown, the mechanism can be made to deal with any other convenient number of successive time instants.

The gear change means may also be arranged so as to permit the sequence of gear changes to be started at any desired ratio $$\frac{n-m}{n}$$

where $m$ is any integer less than $n$, with a suitable gear ratio $$\frac{n}{m}$$

interposed; this arrangement permits of using the same mechanism for a smaller number of observations $m$ than the original number of observations $n$ for which the particular mechanism has been designed.

The mechanism can also be adapted to operate with the gear changes in the reverse direction, that is, using successive step-up gear changes with subtraction of the reading of pointer 76 at the end of the last of the times to be averaged from the final clock time as indicated by pointer 78 in order to obtain the average, according to the expression $$\frac{nt_n - [1(t_2 - t_1) + 2(t_3 - t_2) + \ldots n-1(t_n - t_{n-1})]}{n}$$

or $$t_n - \left[ \frac{1}{n}(t_2 - t_1) + \frac{2}{n}(t_3 - t_2) + \ldots \frac{n-1}{n}(t_n - t_{n-1}) \right]$$

where $t_n$ is the final clock time and the other terms are the same as those referred to at the beginning of the description.

This requires a speed change gear having the ratios in the order $1, 2, 3 \ldots n$ and the above described mechanism can be used to give a step-up gear change in this way by using only five of the six gear ratios provided, since the period between the time datum $t_0$ and the first of the times to be averaged is not involved in the above expression. To do this the lever is altered to drive the single notch cam in the reverse direction and the actuation of the lever at the first time instant is made ineffective or is used for the zeroing action and then at the second of the time instants the 1/6 speed ratio is engaged, then at the third of the time instants the 2/6 speed ratio is engaged and so on up to the 5/6 speed and at the last time instant the mechanism is stopped and the reading of the average time pointer 76 subtracted from the reading of the normal time pointer 78 to give the required average of the six times.

What I claim as my invention and desire to secure by Letters Patent is:

1. Mechanism comprising spaced frame plates carrying a common central spindle having secured thereon between said frame plates a plurality of driving gears of different diameters, a corresponding number of separate spindles disposed in a circle around the central spindle and each journaled at one end in one frame plate and having their other ends floating in clearance holes in the other frame plate, a driven gear secured on each of said separate spindles and constantly meshing with one of said driving gears, a driver pinion secured on each of the separate spindles near its floating end, a loose pinion freely rotatable on said common central spindle and engageable by said driver pinions, means for driving said spindle at constant speed, a swinging arm supporting the floating end of each separate spindle, a spring urging each arm towards the central spindle, a rotatable cam disc co-axial with the central spindle and co-planar with said arms, a notch in said cam disc adapted to receive the free end of an arm and means for rotating said cam disc in a step by step manner to allow the free end of each arm to enter the notch in turn whereby said driver pinions are caused to engage the loose central pinion in predetermined sequence.

2. In a register, means for ascertaining the average value of $n$ number of operations, comprising a movable indicator, means for moving said indicator, and means for varying the speed of movement of said indicator $1/n$ in arithmetical progression, only, during each successive operation, whereby at the conclusion of any of said operations said indicator will indicate directly the average value of the finished operations.

3. Apparatus for indicating the average time of taking a plurality of observations comprising a clock having a motor, an indicator for indicating the average of the times at which a series of $n$ observations are taken, means for actuating said indicator to give the average of said times of occurrence of said observations comprising a variable speed drive connecting said motor and said indicator, said drive having a plurality of speeds of the ratios of from 1 to $1/n$ in an arithmetical progression, and means actuated upon taking an observation for varying the speed of said drive, step by step in the order of said progression only, whereby said indicator travels continuously but at varying speeds to average the times of taking said observations and to indicate said average time at the instant the last of said series of said observations is taken.

4. A register for indicating directly the average time of occurrence of a predetermined number of successive instants of time, each instant being spaced from the succeeding one by a period of time, comprising a driven time indicating means and constant speed driving mechanism for actuating said time indicating means, change speed mechanism interposed between said time indicating means and the driving mechanism, said change-speed mechanism having at least as many ratios in arithmetical progression as the number of instants of time to be averaged and means for successively changing the speed ratio of the change-speed mechanism in sequence, only, at each successive time instant, said ratios of said change-speed mechanism causing said indicating means to indicate directly the average time of occurrence of said instants at the conclusion of the last period.

5. A register for indicating directly the average time of occurrence of a predetermined number $n$ of successive instants of time, each instant being spaced from the succeeding one by a period of time, comprising a driven time indicating means and constant speed driving mechanism therefor, change-speed gearing interposed between said time indicating means and the driving mechanism and having $n$ alternative gear changes in the ratios $$1, \frac{n-1}{n}, \frac{n-2}{n} \ldots \frac{1}{n}$$

and operating means for producing successive gear changes, in the above order, only, at the successive instants, said ratios of said gearing causing said indicating means to indicate directly the average time of occurrence of said instants at the conclusion of the last period.

6. Time averaging mechanism comprising an indicator, a constant speed drive, change-speed gearing, said indicator being driven from said constant speed drive and through said change-speed gearing, said gearing having a plurality of selective speed ratios forming an arithmetical progression and means for selecting the different ratios in arithmetical sequence, only, in conformity with successive time instants to be averaged.

PHILIP FRANCIS EVERITT.

Certificate of Correction

Patent No. 2,285,856.  June 9, 1942.

PHILIP FRANCIS EVERITT

It is hereby certified that error appears in the printed specification of the above numbered patent requiring correction as follows: Page 1, first column, lines 35—36, after $$"t_0 + \frac{n(t_1-t_0)+(n-1)(t_2-t_1)+ \ldots (t_n-t_{n-1})}{n}"$$

insert the word *or*; and that the said Letters Patent should be read with this correction therein that the same may conform to the record of the case in the Patent Office.

Signed and sealed this 21st day of July, A. D. 1942.

[SEAL]

HENRY VAN ARSDALE,
*Acting Commissioner of Patents.*